US008955995B2

(12) United States Patent
Pope et al.

(10) Patent No.: US 8,955,995 B2
(45) Date of Patent: Feb. 17, 2015

(54) KEY LIGHTING ASSEMBLY

(75) Inventors: Michael Thomas Pope, Palatine, IL (US); Benjamin Michael Finney, Itasca, IL (US); Jimmy Bedolla, Elgin, IL (US)

(73) Assignee: Blackberry Limited, Waterloo (CA)

( * ) Notice: Subject to any disclaimer, the term of this patent is extended or adjusted under 35 U.S.C. 154(b) by 662 days.

(21) Appl. No.: 13/282,273

(22) Filed: Oct. 26, 2011

(65) Prior Publication Data

US 2012/0314396 A1 Dec. 13, 2012

Related U.S. Application Data

(60) Provisional application No. 61/496,363, filed on Jun. 13, 2011.

(51) Int. Cl.
*G01D 11/28* (2006.01)
*F21V 8/00* (2006.01)
*H01H 13/83* (2006.01)

(52) U.S. Cl.
CPC .............. *G02B 6/006* (2013.01); *H01H 13/83* (2013.01); *H01H 2219/062* (2013.01); *H01H 2219/064* (2013.01)
USPC .................. 362/23.01; 362/23.07; 362/23.03; 362/97.1

(58) Field of Classification Search
CPC ... H01H 13/83; H01H 2219/062; G02B 6/006
USPC .......................... 362/23.03, 23.01, 23.07, 97.1
See application file for complete search history.

(56) References Cited

U.S. PATENT DOCUMENTS

| 5,053,928 | A  | * | 10/1991 | Pasco ............................... 362/24 |
| 6,558,013 | B2 | * | 5/2003  | Tholin et al. ..................... 362/29 |
| 7,073,916 | B2 | * | 7/2006  | Yin et al. ......................... 362/84 |
| 7,429,709 | B2 |   | 9/2008  | Kim |
| 7,588,338 | B2 | * | 9/2009  | Chou ............................... 362/24 |

(Continued)

FOREIGN PATENT DOCUMENTS

| EP | 1918953 A1 | 5/2008 |
| EP | 2141716 A1 | 1/2010 |

(Continued)

OTHER PUBLICATIONS

EPO, Extended European Search Report relating to EP application No. 11186641.4 dated Oct. 5, 2012.
Office Action mailed Jan. 20, 2014, in corresponding Canadian patent application No. 2,779,669.

*Primary Examiner* — Anabel Ton
(74) *Attorney, Agent, or Firm* — Novak Druce Connolly Bove + Quigg LLP (57) ABSTRACT

The present disclosure describes key lighting assemblies, electronic devices and keycaps. In one aspect, a key lighting assembly comprises a keycap defining at least one key. The keycap has one or more decorations. The assembly comprises a keycap, defining a key. The keycap has a non-opaque portion to identify the key. The assembly further comprises a light guide which is mounted in spaced relation with the keycap and an optical radiation source optically coupled to the light guide. The assembly further comprises a first opaque layer disposed on a first surface of the light guide. The first opaque layer defines a first opaque layer opening for passing optical radiation from the light guide to the keycap. The first opaque layer opening is located to permit optical radiation to be transmitted from the light guide to the non-opaque portion.

20 Claims, 5 Drawing Sheets

(56) References Cited

U.S. PATENT DOCUMENTS

| | | |
|---|---|---|
| 7,677,743 B2 | 3/2010 | Hsu et al. |
| 7,786,394 B2 | 8/2010 | Gao et al. |
| 8,690,368 B1 * | 4/2014 | Shipman et al. ............ 362/23.03 |
| 2008/0037765 A1 | 2/2008 | Finney et al. |
| 2008/0211776 A1 | 9/2008 | Lee |
| 2009/0179862 A1 | 7/2009 | Strong, IV |
| 2009/0283392 A1 | 11/2009 | Kim |
| 2009/0303087 A1 | 12/2009 | Chang |
| 2011/0073456 A1 | 3/2011 | Chen |
| 2014/0151210 A1 * | 6/2014 | Chou ............................ 200/5 A |

FOREIGN PATENT DOCUMENTS

| | | |
|---|---|---|
| EP | 2485233 A1 | 8/2012 |
| WO | 2007027018 A1 | 3/2007 |

* cited by examiner

KEY LIGHTING ASSEMBLY

CROSS-REFERENCE TO RELATED APPLICATION

This application claims the benefit of and priority to U.S. Provisional Patent Application No. 61/496,363 filed Jun. 13, 2011 under the title KEY LIGHTING ASSEMBLY.

The content of the above patent application is hereby expressly incorporated by reference into the detailed description hereof.

TECHNICAL FIELD

The present disclosure relates to electronic devices, and, more particularly, to key lighting assemblies for lighting keys on electronic devices.

BACKGROUND

Electronic devices often have a number of physical keys which may be used for inputting instructions to such devices. In order to facilitate use of electronic devices in low lighting conditions, electronic devices sometimes backlight such physical keys.

When backlighting keys, an effect known as light leak may sometimes occur. Light leak occurs when light is emitted from undesirable portions of the electronic device. Sometimes light leak occurs when light is emitted from the sides of the physical keys. Light leak may also occur where light is leaked directly through the material that the key is constructed of. This may occur, for example, where the key is constructed of a material that transmits light.

Thus, there is a need for improved key lighting assemblies and methods of lighting keys on electronic devices.

BRIEF DESCRIPTION OF THE DRAWINGS

It will be noted that throughout the drawings and description similar features are identified by the same reference numerals.

DETAILED DESCRIPTION OF EXAMPLE EMBODIMENTS

In one aspect, the present disclosure describes a key lighting assembly for lighting one or more keys on an electronic device. The assembly comprises a keycap, defining a key. The keycap has a non-opaque portion to identify the key. The assembly further comprises a light guide which is mounted in spaced relation with the keycap and an optical radiation source optically coupled to the light guide. The assembly further comprises a first opaque layer disposed on a first surface of the light guide. The first opaque layer defines a first opaque layer opening for passing optical radiation from the light guide to the keycap. The first opaque layer opening is located to permit optical radiation to be transmitted from the light guide to the non-opaque portion.

In another aspect, the present disclosure describes an electronic device comprising a controller for controlling the operation of the electronic device. The electronic device further comprises at least one electrical switch connected to the controller for generating an input signal in response to actuation thereof. The electronic device further comprises a key lighting assembly. The assembly comprises a keycap, defining a key. The keycap has a non-opaque portion to identify the key. The assembly further comprises a light guide which is mounted in spaced relation with the keycap and an optical radiation source optically coupled to the light guide. The assembly further comprises a first opaque layer disposed on a first surface of the light guide. The first opaque layer defines a first opaque layer opening for passing optical radiation from the light guide to the keycap. The first opaque layer opening is located to permit optical radiation to be transmitted from the light guide to the non-opaque portion. The at least one electrical switch being disposed for actuation by an interior surface of the keycap.

In at least one aspect, the present disclosure describes example embodiments in which the light guide and the keycap define a gap between an interior surface of the keycap and the first surface of the light guide and wherein the first opaque layer opening passes optical radiation through the gap to the keycap.

In at least one aspect, the present disclosure describes example embodiments in which the non-opaque portion is a decoration on an external surface of the keycap.

In at least one aspect, the present disclosure describes example embodiments in which the optical radiation source is a light.

In at least one aspect, the present disclosure describes example embodiments in which the keycap is cantilever mounted at a first end of the keycap and deflects at a second end to actuate one or more electrical switches.

In at least one aspect, the present disclosure describes example embodiments in which the keycap is a portion of an integrated keycap/display cover which includes a display cover connecting to the keycap.

In at least one aspect, the present disclosure describes example embodiments in which the keycap and the display cover are seamlessly connected.

In at least one aspect, the present disclosure describes example embodiments in which the keycap is cantilevered past an edge of a display module.

In at least one aspect, the present disclosure describes example embodiments in which the first opaque layer is a black tape affixed to the light guide.

In at least one aspect, the present disclosure describes example embodiments in which the key lighting assembly comprises a second opaque layer disposed on an interior surface of the keycap. The second opaque layer covers at least a portion of the interior surface of the keycap. The second opaque layer defines a second opaque layer opening for passing optical radiation. The second opaque layer opening is located in alignment with the non-opaque portion to permit optical radiation to travel to the non-opaque portion.

In at least one aspect, the present disclosure describes example embodiments in which the second opaque layer opening has a shape which correspond to the shape of the non-opaque portion.

In at least one aspect, the present disclosure describes example embodiments in which the second opaque layer opening is larger than the non-opaque portion.

In at least one aspect, the present disclosure describes example embodiments in which the second opaque layer is a black pad printed layer.

In at least one aspect, the present disclosure describes example embodiments in which the keycap is in-mould-decorated.

In at least one aspect, the present disclosure describes example embodiments in which the keycap is cantilever mounted at a first end of the keycap and deflects at a second end of the keycap and in which a portion of the keycap which is located between the second end and the non-opaque portion actuates the electrical switch.

In at least one aspect, the present disclosure describes example embodiments in which the non-opaque portion is an icon identifying a function assigned to the key.

In yet a further aspect, the present disclosure describes a keycap comprising a plastic body comprising a graphic and an opaque layer disposed on an interior surface of the plastic body. The opaque layer defines an opening for transmitting optical radiation to the graphic.

In at least one aspect, the present disclosure describes example embodiments in which the graphic is a decoration on an artwork layer on an external surface of the plastic body.

In at least one aspect, the present disclosure describes example embodiments in which the opining is located in alignment with the graphic to permit optical radiation received at the opening to travel to the graphic.

In at least one aspect, the present disclosure describes example embodiments in which the opaque layer covers at least a portion of the interior surface of the plastic body.

In at least one aspect, the present disclosure describes example embodiments in which the plastic body is comprised of a plastic which transmits optical radiation.

In at least one aspect, the present disclosure describes example embodiments in which the graphic is formed using in-mould decoration.

In at least one aspect, the present disclosure describes example embodiments in which the opaque layer is a black pad printed layer.

In at least one aspect, the present disclosure describes example embodiments in which the opening has a shape which corresponds to a shape of the graphic.

In at least one aspect, the present disclosure describes example embodiments in which the opening is larger than the graphic.

Other example embodiments of the present disclosure will be apparent to those of ordinary skill in the art from a review of the following detailed description in conjunction with the drawings.

Figure 1:
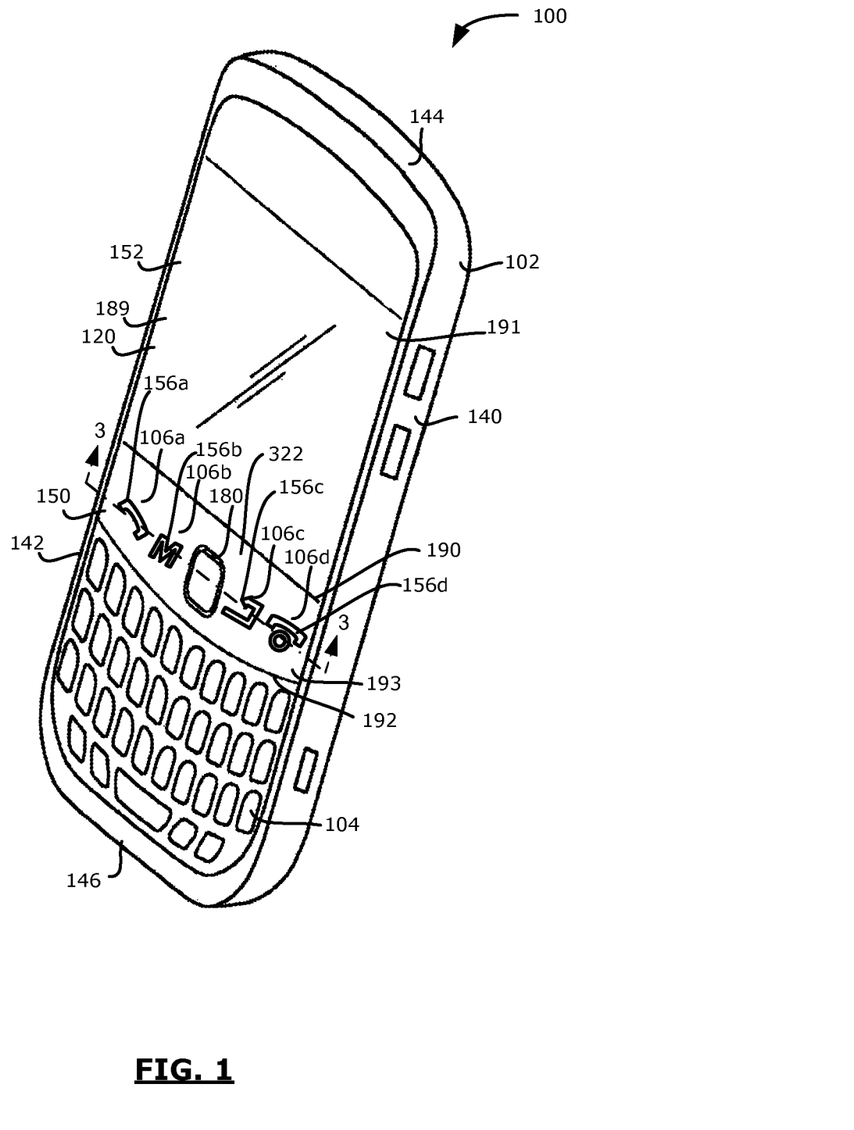
FIG. 1 is front perspective view of an electronic device having a key lighting assembly in accordance with example embodiments of the present disclosure.
Figure 2:
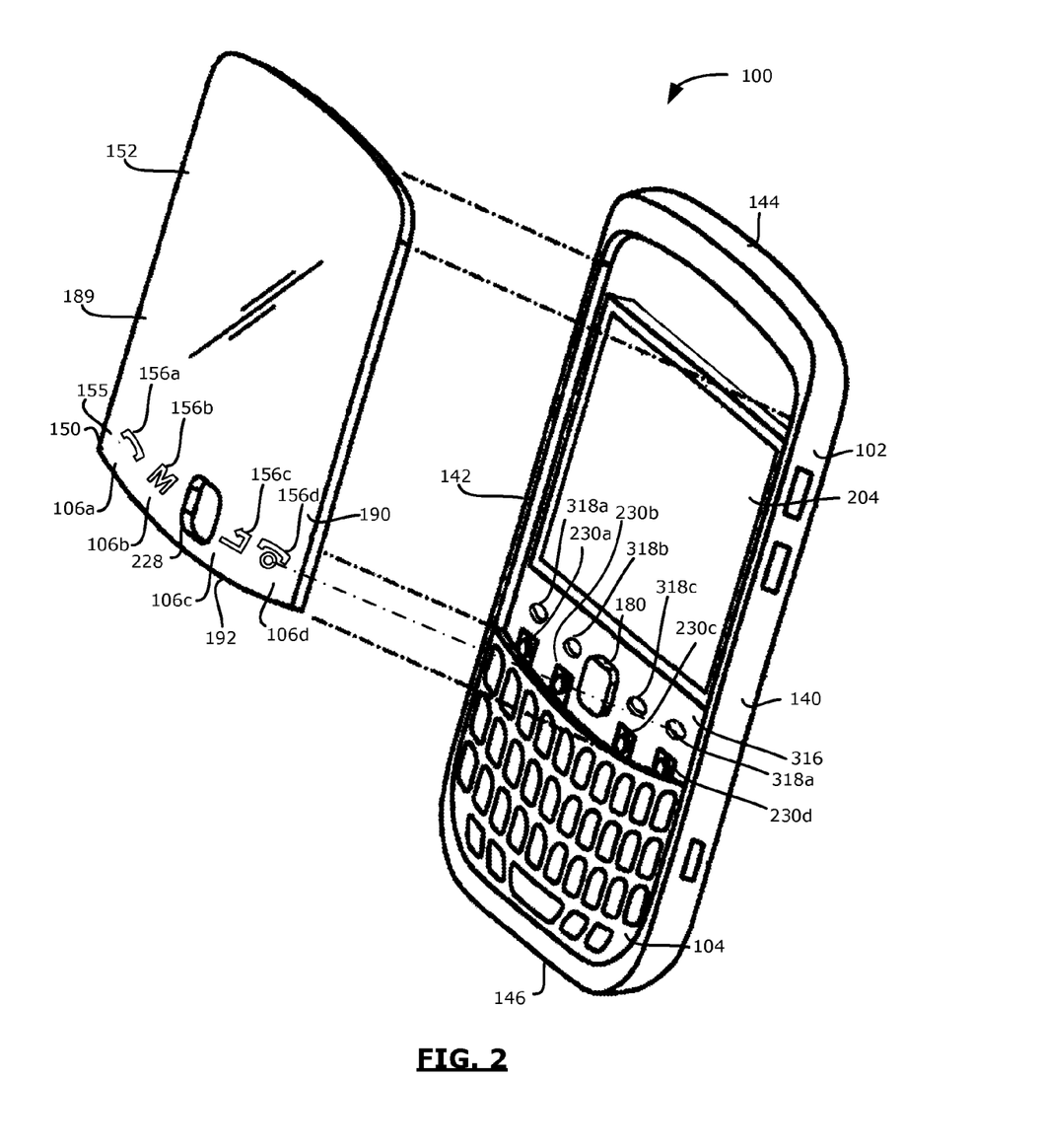
FIG. 2 is a partially exploded perspective view of the electronic device of FIG. 1.
Figure 3:
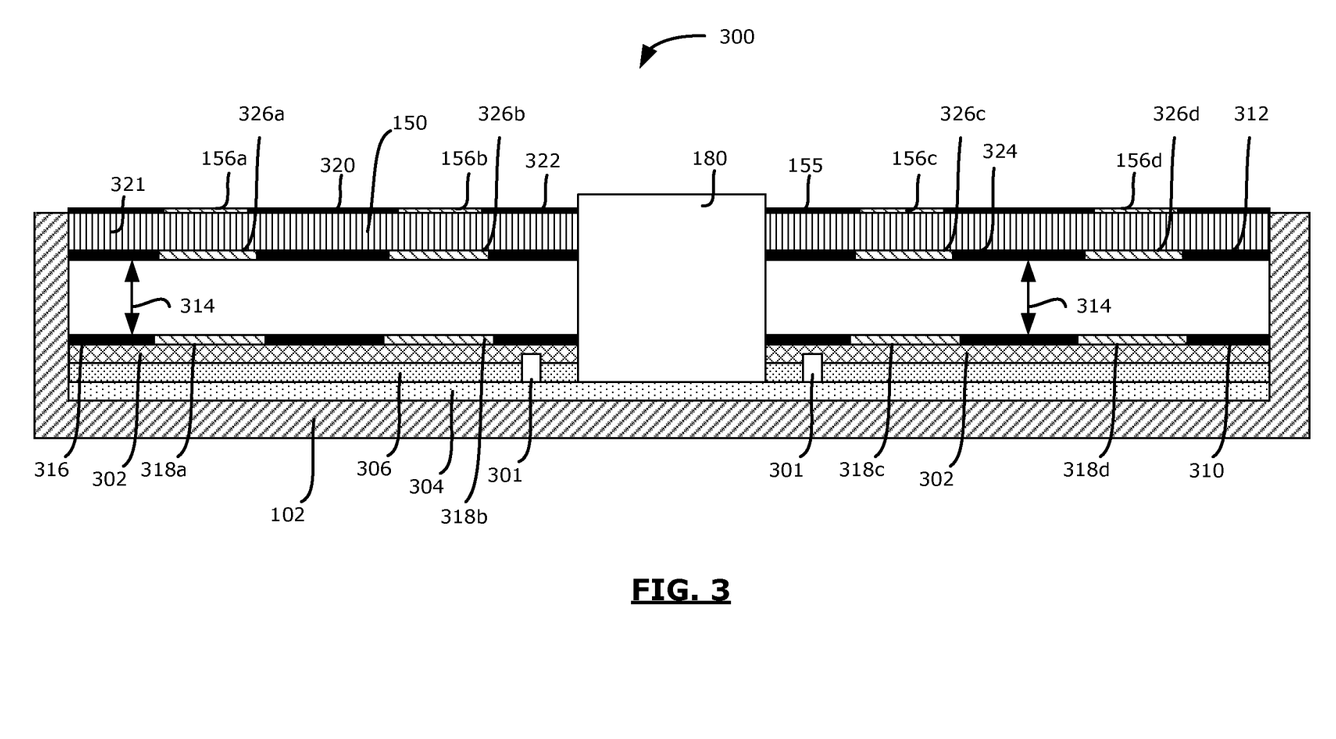
FIG. 3 is a sectional view of the electronic device of FIG. 1 taken along line 3-3 of FIG. 1.

Referring now to FIGS. 1 to 4, an electronic device 100 according to the present disclosure is illustrated. More particularly, FIG. 1 illustrates a perspective view of an example electronic device 100, FIG. 2 illustrates a partially exploded perspective view of the example electronic device 100 and FIG. 3 illustrates a sectional view of the example electronic device 100 taken along lines 3-3 of FIG. 1.

In the example embodiment shown, the electronic device 100 is a handheld mobile communication device. However, the teachings described herein may be applied to other electronic devices. Such electronic devices may, in various example embodiments, include portable electronic devices such as mobile communication devices, including pagers, smartphones, cellular phones, global positioning system (GPS) navigation devices and other satellite navigation devices, wireless organizes, wireless personal digital assistants (PDA), desktop, netbook and notebook computers and tablet computers. The electronic devices may, in various embodiments, be devices without wireless communication capabilities such as PDAs, electronic gaming devices, digital photograph albums or picture frames, digital cameras or digital video recorders. These examples are intended to be non-limiting.

Figure 5:
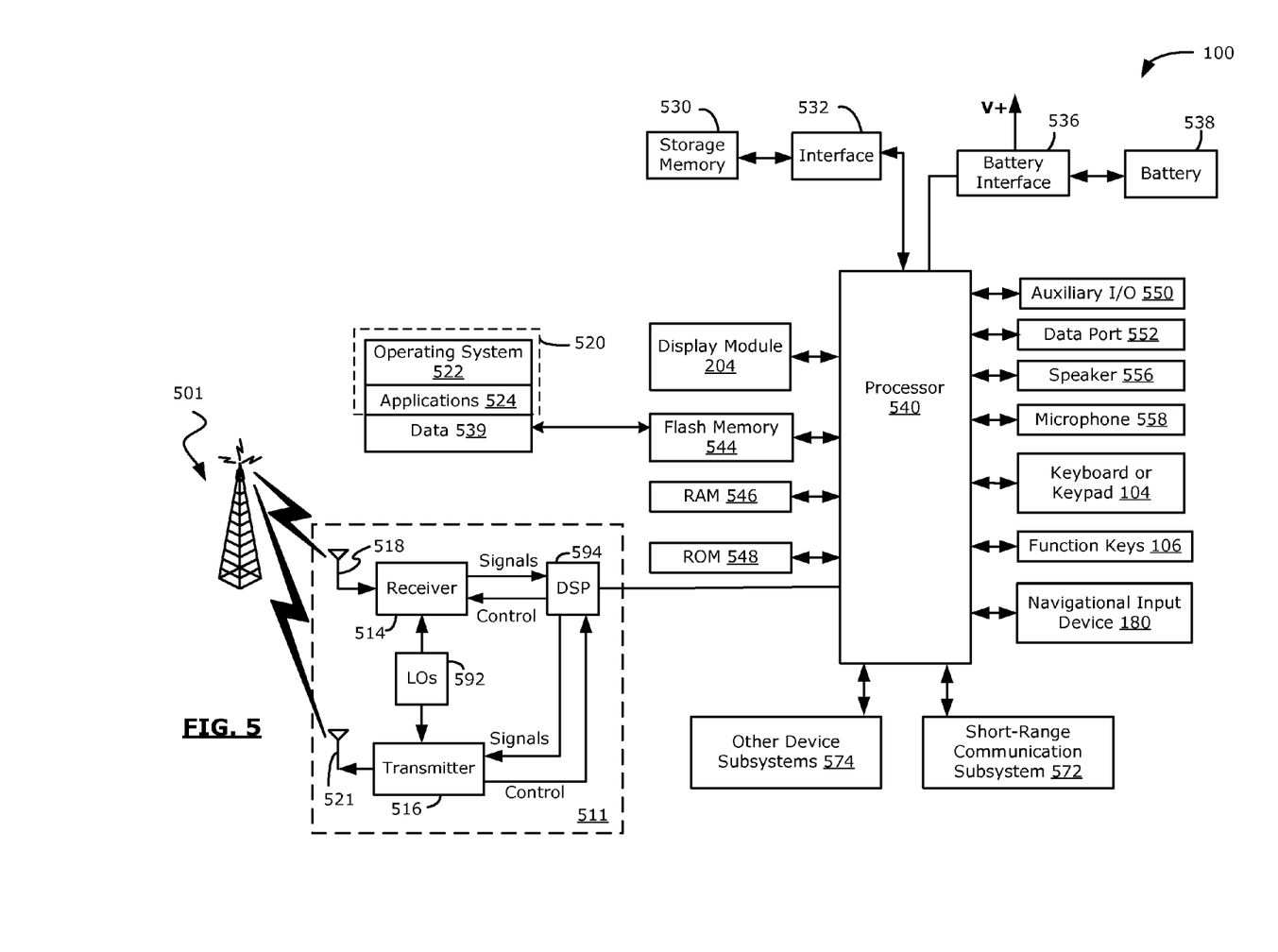
FIG. 5 is a block diagram of an electronic device in accordance with example embodiments of the present disclosure.

The electronic device 100 includes a housing 102 which contains various electronic components which control operation of the device electronic 100. Such electronic components may include, for example, one or more processor 540 (FIG. 5). Other example electronic components which may be housed in the housing 102 will be discussed in greater detail below with reference to FIG. 5.

In some example embodiments, the electronic device 100 includes a physical keyboard or keypad 104. The keyboard or keypad 104 may be an alphanumeric keyboard or keypad which facilitates entry of alphanumeric characters into the electronic device 100. In at least some example embodiments, the keyboard or keypad 104 may be a QWERTY or DVORAK keyboard. The keyboard or keypad 104 includes a plurality of keys which are actuatable by a user to provide inputs to the electronic device 100.

In the example embodiment of FIGS. 1 to 4, the physical keyboard or keypad 104 is exposed by the housing 102 through a front surface of the housing. However, other keyboard or keypad 104 orientations are also possible. For example, in some example embodiments, the keyboard or keypad 104 is a sliding keyboard or foldout keyboard which is movable between an exposed position in which keys of the keyboard or keypad 104 are exposed and a protected position in which keys of the keyboard or keypad 104 are protected. That is, in the protected position, the keys of the keyboard or keypad 104 are hidden by other features of the electronic device 100. In yet other example embodiments (not illustrated), the electronic device 100 may be an electronic device which does not include a physical keyboard or keypad 104. Instead, alphanumeric input may be achieved through the use of a virtual keyboard displayed on a touchscreen of the electronic device 100.

The housing 102 houses a key and display assembly 120. In the example embodiment illustrated, the key and display assembly 120 is disposed within the housing 102 adjacent to the keyboard or keypad 104. More particularly, in the example embodiment illustrated, the electronic device 100 is oriented in a portrait orientation in which a left side 142 and a right side 140 of the electronic device 100 are longer than a top side 144 and a bottom side 146 of the electronic device 100. In this orientation, the key and display assembly 120 is disposed above the keyboard or keypad 104. That is, in the key and display assembly 120 is located closer to the top side 144 than is the keyboard or keypad 104. In this orientation, the keyboard or keypad 104 is actuatable by a user's thumbs when the device 100 is cradled in a user's hands.

Figure 4:
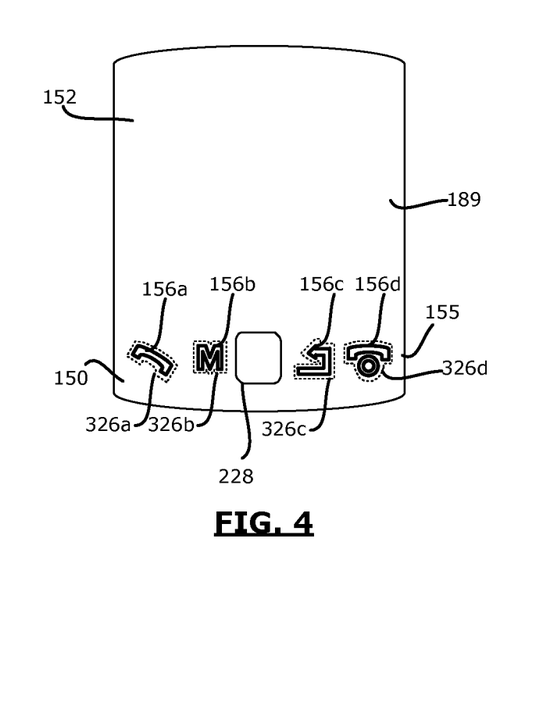
FIG. 4 is a top view of an integrated keycap/display cover in accordance with example embodiments of the present disclosure.

The key and display assembly 120 provides both display and input capabilities on the electronic device 100. That is, the key and display assembly 120 includes one or more sub-assemblies, which together provide for both display and input through one or more physical keys. In the illustrated embodiment, the key and display assembly 120 includes a display assembly 191 (which includes components used for displaying data), a function key assembly 193 (which includes components used for input), and a key lighting assembly 300 (FIG. 3) (which includes components used for backlighting keys). Some of the components used in each of these sub-assemblies may be common to two or more of these sub-assemblies. For example, as will be explained in greater detail below, the key lighting assembly 300, the function key assembly 193 and the display assembly 191 may, in at least some example embodiments, include a single integrated keycap/display cover 189 (which is illustrated in FIG. 4) which is usable by each of these sub-assemblies.

The display assembly 191 includes a display cover 152 which is disposed within the housing 102 to overlay a display module 204 (FIG. 2). The display cover 152 may also be referred to as a lens. The display cover 152 is transparent, permitting users to view the display module 204, which is disposed beneath the display cover 152. The display cover 152 protects components disposed therebelow and inhibits debris and other contaminants from entering the electronic device 100.

The display module 204 is supported by the housing 102 and is in communication with a controller, such as the processor 540 (FIG. 5). The display module 204 displays information to the device user and, in some example embodiments, is a liquid crystal display (LCD) module. Alternatively, in at least some example embodiments, the display module 204 may be another type of display device, such as an organic light emitting diode (OLED) module, a plasma display panel (PDP) module, or the like. In the example embodiment illustrated, the display module 204 is disposed above the keyboard or keypad 104. That is, the display module is closer to the top side 144 of the electronic device 100 than is the keyboard or keypad 104.

A key assembly 193 is disposed in the housing beneath the display assembly. That is, the key assembly 193 is disposed in the housing 102 and is nearer to the bottom side 146 of the electronic device 100 than is the display module 204.

The key assembly 193 includes a keycap 150 defining one or more function keys 106a, 106b, 106c, 106d. The keycap 150 includes an external surface 155 (shown in FIGS. 2 and 3) which is exposed by a front surface of the housing 102.

The function keys 106a, 106b, 106c, 106d are actuatable by a user of the electronic device 100 to input commands to the electronic device 100. In the example illustrated, there are four function keys 106 which are disposed horizontally between the left side 142 and the right side 140 of the electronic device 100. The function which is assigned to each function key 106a, 106b, 106c, 106d by the electronic device 100 may, in at least some example embodiments, vary based on the operating state of the electronic device 100. In the illustrated embodiment, the function keys 106a, 106b, 106c, 106d include a first function key 106a, which may be a send key which may be used to input a command to initiate communications on the electronic device 100. In the illustrated example embodiment, the function keys 106a, 106b, 106c, 106d also include a second function key 106b, which may be a menu key which may be used to input a command to display a menu on a display screen of the electronic device 100. In the illustrated example embodiment, the function keys 106a, 106b, 106c, 106d also include a third function key 106c, which may be an escape key, and which may also be referred to as a back key. The escape key may be used to input a command to exit from an application, module or state or to input a command to return to a previous state, such as a previously viewed web page. In the illustrated example embodiment, the functions keys 106a, 106b, 106c, 106d also include a fourth function key 106d, which may be an end or power key. The end or power key may be used to input a command to terminate an operating state, module or application running on the electronic device 102. For example, the end or power key may be used to input a command to hang-up a call or to input a command to power down the electronic device 100.

In the example embodiment illustrated, the key assembly 193 is located immediately adjacent to the display module 204 (FIG. 2) and is immediately beneath the display module (i.e. closer to the bottom side 146 than is the display module 204). This arrangement permits keys associated with the key assembly to be actuated by a user's thumbs when the device 100 is cradled in the hands of its user.

The function keys 106a, 106b, 106c, 106d each include one or more decorations 156a, 156b, 156c, 156d on the external surface 155 of the keycap 150. The decorations 156a, 156b, 156c, 156d are comprised of icons, text, images, or other indicia which identify a function assigned to the function key 106a, 106b, 106c, 106d associated with that decoration 156a, 156b, 156c, 156d. For example, in the embodiment illustrated, a telephone icon is used to represent the send key, the letter "M" is used to represent the menu key, a back arrow icon is used to represent the escape key, and an on-cradle telephone icon is used to represent the end or power key. The decorations 156a, 156b, 156c, 156d are each associated with one of the function keys 106a, 106b, 106c, 106d. For example, a first decoration 156a may be associated with the first function key 106a, a second decoration 156b may be associated with the second function key 156b, a third decoration 156c may be associated with the third function key 156c and a fourth decoration 156d may be associated with the fourth function key 156d.

As illustrated in FIG. 2, the keycap 150 may be cantilever mounted at a first end 190 of the keycap 150. That is, the keycap 150 is supported at the first end 190 of the keycap 150. The first end 190 of the keycap 150 is the end of the keycap 150 which is nearest to the display cover 152 (It is generally in the region represented by the line between the keycap 150 and display cover 152 illustrated in FIG. 1). In the example illustrated, the keycap 150 and the display cover 152 are a single component, which may be referred to as an integrated keycap/display cover 189. The integrated keycap/display cover 189 includes the keycap 150 and the display cover 152. In at least some example embodiments, the integrated keycap/display cover 189 seamlessly connects the keycap 150 to the display cover 152. That is, the integrated keycap/display cover 189 is generally continuous, even at the point of connection between the keycap 150 and the display cover 152. The integrated keycap/display cover 189 includes an exterior surface (not numbered) which is level across its surface. In at least some example embodiments, the integrated keycap/display cover lacks breaks and changes in thickness.

In the embodiment illustrated, the display cover 152 portion of the integrated keycap/display cover 189 overlies the display module 204. That is, the display cover 152 portion of the integrated keycap/display cover is mounted in place over the display module 204. Since the display module 204 is higher than the portions of the key assembly and or the key lighting assembly which are beneath the keycap 150, the result is that the keycap 150 portion of the integrated keycap/display cover 189, is cantilevered past an edge of the display module 152. This effect is illustrated in FIGS. 2 and 3.

As illustrated in FIG. 2, the key assembly also includes one or more electrical switches 230a, 230b, 230c, 230d mounted within the housing 102 beneath the keycap 150. The electrical switches 230a, 230b, 230c, 230d mounted beneath the keycap 150 are each associated with corresponding function keys 106a, 106b, 106c, 106d. The electrical switches 230a, 230b, 230c, 230d are connected to one or more controllers, such as one or more processors 540 (FIG. 5) associated with the electronic device 100 and provide input signals to the processors 540.

The electrical switches 230a, 230b, 230c, 230d are each associated with and aligned with corresponding keys. In the example illustrated, a first electrical switch 230a is associated with and aligned with the first function key 106a (e.g. the send key), a second electrical switch 230b is associated with and aligned with the second function key 106b (e.g. the menu key), a third electrical switch 230c is associated with and aligned with the third function key 106c (e.g. the escape key) and a fourth electrical switch 230d is associated with and aligned with the fourth function key 106d (e.g. the end or power key).

Where the keycap 150 is cantilever mounted at the first end 190 of the keycap 150, the keycap 150 may deflect at a second end 192, which is opposite the first end 190, in response to the application of an external force on the external surface 155 of the keypad. When such a deflection occurs, the keycap 150 may actuate the electrical switch 230a, 230b, 230c, 230d which is associated with the portion of the keycap where the external force was applied.

Where the keycap 150 is cantilever mounted at the first end 190, maximum deflection of the keycap 150 will occur at the furthest point from the first end 190 on the cantilevered keycap 150. That is, maximum deflection will occur at the second end 192. Accordingly, in at least some embodiments, the electrical switches 230a, 230b, 230c, 230d are disposed near the second end 192 of the keycap. That is, the electrical switches 230a, 230b, 230c, 230d are disposed to be actuated by a portion of the keycap 150 which is near the second end 192.

In the example embodiment illustrated, the electrical switches 230a, 230b, 230c, 230d are located in a position in which permits them to be actuated by a portion of the keycap which is located between the second end 192 and the decoration.

By locating the electrical switches 230a, 230b, 230c, 230d in this position, the space beneath the decorations 156a, 156b, 156c, 156d on the keycap 150 is not obstructed by the electrical switches 230a, 230b, 230c, 230d. Locating the electrical switches 230a, 230b, 230c, 230d away from the decorations 156a, 156b, 156c, 156d facilitates backlighting of the keycap 150.

Since a common keycap 150 includes a plurality of function keys 106a, 106b, 106c, 106d, when a force is applied to the keycap 150 at one of the function keys 106a, 106b, 106c, 106d, there may be a tendency for an adjacent key to also depress, thereby engaging its associated electrical switch 230a, 230b, 230c, 230d. In order to prevent adjacent function keys 106a, 106b, 106c, 106d from deflecting when a function key 106a, 106b, 106c, 106d is depressed, the key assembly may include features which prevent or inhibit movement of adjacent keys 106a, 106b, 106c, 106d. Such features may include, for example, indentations or grooves (not shown) on the interior surface 312 (FIG. 3) of the keycap 150 between keys 106a, 106b, 106c, 106d which allows the keycap 150 to bend.

In at least some example embodiments, the electrical switches 230a, 230b, 230c, 230d are dome switches. The dome switches may be included on a dome sheet which mechanically connects the dome switches together to provide stability to the dome switches and to hold the dome switches in place.

The electronic device 100 may include additional input devices in addition to the input devices discussed above. In the embodiment of FIGS. 1 to 4, the electronic device 100 includes a navigational input device 180. In the illustrated embodiment, the keycap 150 defines a passageway 228 (FIG. 2) through which the navigational input device 180 extends.

The navigational input device 180 may be comprised of a trackpad. In other embodiments, the navigational input device 180 may be a trackball. Other navigational input devices 180 are also possible.

Key Lighting Assembly

In order to facilitate use of the function keys 106 in dark or dim lighting, at least some example embodiments include a key lighting assembly 300 (FIG. 3), which may be used to backlight a lit-region of the keycap 150. Backlighting attempts to provide light to lit-regions of the electronic device 100 while minimizing light leakage or escape through unlit regions.

The lit-regions of the keycap 150 are the portions of the keycap 150 where it is considered desirable to emit light from the device 100. Such regions can be contrasted with unlit regions, which are regions where it is not desirable to emit light. In the example illustrated, the non-opaque decorations 156a, 156b, 156c, 156d (such as the icons, text, etc.) on the keycap 150 are the lit-regions of the keycap 150. That is, the illustrated example attempts to illuminate the decorations 156a, 156b, 156c, 156d. The decorations 156a, 156b, 156c, 156d are non-opaque portions of the keycap 150. The decorations 156a, 156b, 156c, 156d may be comprised of a graphic, such as an icon, text, etc. which are able to transmit some optical radiation. The non-opaque portions are capable of transmitting at least a portion of the optical radiation (i.e. light) received at one side of the non-opaque portion to a second side of the non-opaque portion.

The key lighting assembly 300 includes the keycap 150 which was discussed above with reference to the key assembly. The keycap 150 may be considered to be part of both the key assembly 193 and the key lighting assembly 300 since it includes features which assist both in providing input to the electronic device 100 (which is a feature which may be provided by the key assembly) and includes features which assist in providing backlighting to the keys 106a, 106b, 106c, 106d (which is a feature which is provided by the by key lighting assembly 300 (FIG. 3)). The keycap 150 defines at least one key and has one or more decorations 156a, 156b, 156c, 156d on an external surface 155 of the keycap 150, which may be used to identify the keys.

The key lighting assembly 300 includes one or more optical radiation sources 301 which provide backlighting for the function keys 106a, 106b, 106c, 106d. The optical radiation sources 301 may be mounted on or connected to a printed circuit board (PCB) 304 and disposed within the housing 102, beneath the keycap 150. In the embodiment illustrated, two lights are included as optical radiation sources. Each light functions to illuminate one region of the keycap. In the embodiment illustrated, a first light illuminates the leftmost keys of the keycap and a second light illuminates the rightmost keys of the keycap. The lights may, in some embodiments, be comprised of light emitting diodes ("LEDs").

The key lighting assembly 300 includes one or more light guides 302. The light guides 302 distribute light generated by the optical radiation source 301 (e.g. the lights) to other areas of the electronic device 100. Accordingly, each light guide 302 is optically coupled to at least one of the optical radiation sources 301 (e.g. the lights).

The light guide 302 is located within the housing, beneath the keycap 150. In the embodiment illustrated, the light guide 302 is layered on top of a metal chassis 306 which covers the PCB 304. The metal chassis 306 facilitates mounting of various components of the electronic device 100 and strengthens the device.

To distribute light, the light guide 302 is constructed of a material that is transparent or, in some embodiments, translucent. For example, the light guide 302 may, in at least some example embodiments, be constructed of a clear plastic or silicone.

The light guide 302 is mounted in spaced relation to the keycap 150. More particularly, the light guide 302 and the keycap 150 jointly define a gap 314 between an interior surface 312 of the keycap 150 and a first surface 310 (which is the upper-most surface) of the light guide 302. When the keycap 150 is not deflected, the gap 314 is, in at least some embodiments, in the range of 0.4 to 0.6 millimeters. In some embodiments, the gap is approximately 0.5 millimeters.

In at least some example embodiments, the gap 314 is an air gap which is not obstructed by any additional components. The use of an unobstructed gap facilitates deflection of the keycap 150 in order to allow the keycap 150 to easily engage the electrical switches 230a, 230b, 230c, 230d (FIG. 2). Furthermore, the air within the gap may be utilized as a transmission medium for light which is generated by the optical radiation sources 301.

To control light, in at least some example embodiments, a first opaque layer 316 is disposed on the first surface 310 (which is the upper-most surface) of the light guide 302. The first opaque layer 316 includes a light blocking portion which covers at least a portion of the light guide 302 and blocks light emitted from the light guide 302. The first opaque layer 316 is, in at least some example embodiments, comprised of black tape, which may be affixed to the light guide 302. The black tape is, in at least some embodiments, a die cut tape.

The first opaque layer 316 defines one or more first opaque layer openings 318a, 318b, 318c, 318d for passing light from the light guide 302, through the gap 314, to the lit-regions of the keycap 150 (i.e. the decorations 156a, 156b, 156c, 156d). More particularly, the openings 318a, 318b, 318c, 318d are located in alignment with the decoration to permit light to travel from the light guide to the decorations. That is, the openings 318a, 318b, 318c, 318d are located immediately beneath an associated lit-region of the keycap 150 (i.e. beneath an associated decoration 156a, 156b, 156c, 156d). For example, a first first opaque layer opening 318a may be associated with and located in alignment with the first decoration 156a, a second first opaque layer opening 318b may be associated with and located in alignment with the second decoration 156b, a third first opaque layer opening 318c may be associated with and located in alignment with the third decoration 156c and a fourth first opaque layer opening 318d may be associated with and located in alignment with the third decoration 156d.

The openings 318a, 318b, 318c, 318d may be at least as large as the associated decoration 156a, 156b, 156c, 156d which the openings are used to light. That is, the openings 318a, 318b, 318c, 318d may be sufficiently large that they are beneath every portion of their associated decoration 156a, 156b, 156c, 156d.

To ensure that the decorations 156a, 156b, 156c, 156d are fully lit, the openings 318a, 318b, 318c, 318d may be larger than their associated decorations 156a, 156b, 156c, 156d. Such a configuration may ensure that the edges of the decorations are illuminated. The opening 318a, 318b, 318c, 318d is, in at least some example embodiments, a circular or ovular opening. However, other orientations may also be used.

In at least some example embodiments, the keycap 150 is an in-mould-decorated keycap 150. In-mould decoration is a special type of plastic moulding which may be used for decorating plastic surfaces with color. In-mould decoration may be used to produce a keycap 150 having a plastic body 321, which transmits optical radiation and which has an artwork layer 320 located on an external surface 155 of the plastic body. The plastic body may be comprised of a plastic that is generally translucent or transparent, such as a clear plastic. The artwork layer 320 may include the one or more graphics (i.e. the non-opaque decorations 156a, 156b, 156c, 156d) which are to be lit. The graphics (i.e. the non-opaque decorations 156a, 156b, 156c, 156d) typically include at least a portion which is of a different color than the background color. To provide backlighting of the keys, the decorations 156 are typically designed to be at least partially translucent. That is, the decorations 156 permit at least some light to pass through the decorations.

The artwork layer 320 may also include a background color region 322. The background color region 322 provides the keycap 150 with a background color. The background color is the color that is applied to a large portion of the external surface 155 of the keycap 150. The background color is, in at least some example embodiments, an opaque color, such as black. In other embodiments, the background color may be a more translucent color, such as white. Other, colors may also be used. The use of a more translucent color may be desirable to some users for aesthetic reasons or to allow users to select electronic devices 100 which accord with their personal color and style preferences. However, the use of more translucent colors sometimes presents greater challenges with regards to backlighting of keys, since the background color may emit light. That is, the use of more translucent colors may cause light leakage (i.e. light emission from undesirable areas, such as through the background color).

In order to provide greater control over light distribution and help prevent light leakage, in at least some example embodiments, the key lighting assembly 300 comprises a second opaque layer 324 which is disposed on the interior surface 312 of the keycap 150. The second opaque layer 324 covers at least a portion of the interior surface 312 of the keycap 150. The second opaque layer defines one or more second opaque layer opening 326a, 326b, 326c, 326d for passing light. The second opaque layer openings 326a, 326b, 326c, 326d are located on the keycap 150 in a position which is in alignment with the decorations 156a, 156b, 156c, 156d to permit light to travel from gap 314 to the decorations 156a, 156b, 156c, 156d. That is, the second opaque layer openings 326a, 326b, 326c, 326d are located immediately beneath an associated lit-region of the keycap 150 (i.e. beneath an associated decoration 156a, 156b, 156c, 156d). For example, a first second opaque layer opening 326a is associated with and located in alignment with a first decoration 156a, a second second opaque layer opening 326b is associated with and located in alignment with a second decoration 156b, a third second opaque layer opening 326c is associated with and located in alignment with a third decoration 156c and a fourth second opaque layer opening 326d is associated with and located in alignment with a fourth decoration 156d.

The second opaque layer openings 326a, 326b, 326c, 326d are also located immediately above corresponding first opaque layer openings 318a, 318b, 318c, 318d. Thus, the second opaque layer openings 326a, 326b, 326c, 326d and the first opaque layer openings collectively guide light from the light guide 302 to the lit regions (i.e. the decorations 156a, 156b, 156c, 156d) of the keycap 150. The first opaque layer openings 318a, 318b, 318c, 318d and the second opaque layer openings 326a, 326b, 326c, 326d create a channel of light in the air gap 314.

In at least some embodiments, the second opaque layer 324 is a pad printed layer, such as a black pad printed layer. The black pad printed layer is a black ink layer which acts to block the transmission of light.

In at least some example embodiments, the second opaque layer openings 326a, 326b, 326c, 326d are at least as large as their associated lit-region (i.e the region which that second opaque layer opening 326a, 326b, 326c, 326d is used to light which, in the example illustrated is a decoration 156a, 156b, 156c, 156d).

To ensure that the decorations 156a, 156b, 156c, 156d are fully lit, the second opaque layer opening 326a, 326b, 326c, 326d may be larger than their associated decorations 156a, 156b, 156c, 156d. Such a configuration may ensure that the edges of the lit-region are illuminated.

To better focus light, in at least some example embodiments, the second opaque layer openings 326a, 326b, 326c, 326d are each smaller than their associated first opaque layer openings 318a, 318b, 318c, 318d. That is, the first opaque layer openings 318a, 318b, 318c, 318d may be sufficiently large that they are beneath every portion of their associated second opaque layer opening 326a, 326b, 326c, 326d and the second opaque layer openings 326a, 326b, 326c, 326d may be sufficiently large that they are beneath every portion of their associated decorations.

Referring now to FIG. 4, which illustrates a top view of an integrated keycap/display cover 189, in some example embodiments, the second opaque layer openings 326a, 326b, 326c, 326d are each in the form of a shape that corresponds to the shape of the decoration 156 associated with that second opaque layer opening 326. For example, where the decorations 156a, 156b, 156c, 156d are icons, the second opaque layer openings 326a, 326b, 326c, 326d may have a shape that corresponds with the icons. For example, the second opaque layer openings 326a, 326b, 326c, 326d may mirror the outline of the external perimeter of the icon (or other indicia) of their associated decoration 156a, 156b, 156c, 156d. In the embodiment illustrated, a telephone icon is used to represent the send key. The second opaque layer opening 326a which is associated with the telephone icon is also in the form of a telephone. Similarly, in the embodiment illustrated, the letter "M" is used to represent the menu key. Accordingly, the associated second opaque layer opening 326b takes the form of a letter M (or a crude outline of the letter M). Similarly, where a back arrow icon is used to represent the escape key, the associated second opaque layer opening 326c may take the form of a back arrow. Where an on-cradle telephone icon is used to represent the end or power key, the associated second opaque layer opening 326d may take the form of an on-cradle telephone icon.

Using second opaque layer openings 326a, 326b, 326c, 326d with shapes that relate to the shapes of the decorations 156a, 156b, 156c, 156d of the keycap 150 may reduce the amount of light leakage. For example, this configuration may reduce the amount of light projected on unlit regions (i.e. areas which we do not intend to light, such as the background color region 322). This may be useful, for example, where the background color region 322 has a background color which is not wholly opaque, and which may transmit some light.

Variations of the example embodiments described above are possible. For example, in one variant, the gap 314 between the keycap 150 and the lightguide 302 may include one or more gaskets (not illustrated). The gaskets are constructed of a compressible material, such as foam, which permits keycap 150 to deflect and engage the electrical switches 230a, 230b, 230c, 230d (FIG. 2). The gaskets define one or more passageways from the light guide 302 to the lit-regions (i.e. decorations 156) of the keycap 150 which serve to transmit light to the lit-regions. The surfaces of the gaskets along the passageways are opaque to prevent light from entering the gasket itself.

Example Mobile Communication Device

Reference is now made to FIG. 5 which illustrates a block diagram of an electronic device 100 in which example embodiments described in the present disclosure can be applied. The block diagram illustrates various electronic components which may be present in the electronic device 100. Many of these electronic components may be contained within the housing 120 of FIGS. 1 to 3.

In the illustrated embodiment, the electronic device 100 is a two-way mobile communication device having data and possibly also voice communication capabilities. The electronic device 100, in at least some example embodiments, has the capability to communicate with other computer systems; for example, via the Internet.

The electronic device 100 includes a controller including at least one processor 540 such as a microprocessor which controls the overall operation of the electronic device 100, and a wireless communication subsystem 511 for exchanging radio frequency signals with a wireless network 501. The processor 540 interacts with the communication subsystem 511 which performs communication functions. That is, the communication subsystem 511 is configured to provide communication services using a plurality of communication technologies. For example, the electronic device 100 may be equipped to communicate via any one or combination of: electronic mail (e-mail), text messaging, such as short message service messaging (SMS), multimedia messaging service (MMS), instant messaging, voice-based communications, social network based messaging, Device-to-Device based messaging, or facsimile. Other communication technologies may also be employed.

The processor 540 interacts with additional device subsystems, such as the display module 204. The display module 204 is, in at least some embodiments, a touchscreen display which has a touch-sensitive overlay connected to an electronic controller. The touchscreen display acts as an input mechanism to provide a touch sensitive input device. In other example embodiments, the display module 204 may not be a touchscreen display. Instead, the electronic device 100 may include a non-touch display and one or more input mechanisms, such as, for example, a keyboard or keypad 104, one or more function keys 106 (which may be included on a key assembly and which may include one or more electrical switches 230a, 230b, 230c, 230d (FIG. 2)), and/or a navigational input device 180, such as a trackpad or trackball.

The processor 540 interacts with additional device subsystems including flash memory 544, random access memory (RAM) 546, read only memory (ROM) 548, auxiliary input/output (I/O) subsystems 550, data port 552 such as serial data port, such as a Universal Serial Bus (USB) data port, speaker 556, microphone 558, short-range communication subsystem 572, and other device subsystems generally designated as 574. Some of the subsystems shown in FIG. 5 perform communication-related functions, whereas other subsystems may provide "resident" or on-device functions.

The communication subsystem 511 includes a receiver 514, a transmitter 516, and associated components, such as one or more antenna elements 518 and 521, local oscillators (LOs) 592, and a processing module such as a digital signal processor (DSP) 594. The antenna elements 518 and 521 may be embedded or internal to the electronic device 100 and a single antenna may be shared by both receiver and transmitter, as is known in the art. As will be apparent to those skilled in the field of communication, the particular design of the communication subsystem 511 depends on the wireless network 501 in which the electronic device 100 is intended to operate.

The electronic device 100 may communicate with any one of a plurality of fixed transceiver base stations (not shown) of the wireless network 501 within its geographic coverage area. The electronic device 501 may send and receive communication signals over the wireless network 501 after a network registration or activation procedures have been completed. Signals received by the antenna 518 through the wireless network 501 are input to the receiver 514, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 594. In a similar manner, signals to be transmitted are processed, including modulation and encoding, for example, by the DSP 594. These DSP-processed signals are input to the transmitter 516 for digital-to-analog (D/A) conversion, frequency up conversion, filtering, amplification, and transmission to the wireless network 501 via the antenna 521. The DSP 594 not only processes communication signals, but may also provide for receiver and transmitter control. For example, the gains applied to communication signals in the receiver 514 and the transmitter 516 may be adaptively controlled through automatic gain control algorithms implemented in the DSP 594.

The processor 540 operates under stored program control and executes software modules 520 stored in memory such as persistent memory; for example, in the flash memory 544. As illustrated in FIG. 5, the software modules 520 include operating system software 522 and software applications 524.

The software modules 520 or parts thereof may be temporarily loaded into volatile memory such as the RAM 546. The RAM 546 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 524 may include a range of other applications, including, for example, an address book application, a messaging application, a calendar application, and/or a notepad application. In some example embodiments, the software applications 524 include an email message application, a push content viewing application, a voice communication (i.e. telephony) application, a map application, and a media player application. Each of the software applications 524 may include layout information defining the placement of particular fields and graphic elements (e.g. text fields, input fields, icons, etc.) in the user interface (i.e. the display module 204) according to the application.

In some example embodiments, the auxiliary input/output (I/O) subsystems 550 may include an external communication link or interface, for example, an Ethernet connection. The electronic device 100 may include other wireless communication interfaces for communicating with other types of wireless networks; for example, a wireless network such as an orthogonal frequency division multiplexed (OFDM) network or a GPS transceiver for communicating with a GPS satellite network (not shown). The auxiliary I/O subsystems 550 may include a vibrator for providing vibratory notifications in response to various events on the electronic device 100 such as receipt of an electronic communication or incoming phone call, or for other purposes such as haptic feedback (touch feedback).

In some example embodiments, the electronic device 100 also includes a removable memory module 530 (typically including flash memory, such as a removable memory card) and a memory interface 532. Network access may be associated with a subscriber or user of the electronic device 100 via the memory module 530, which may be a Subscriber Identity Module (SIM) card for use in a GSM network or other type of memory card for use in the relevant wireless network type. The memory module 530 is inserted in or connected to the memory card interface 532 of the electronic device 100 in order to operate in conjunction with the wireless network 501.

The electronic device 100 stores data 539 in an erasable persistent memory, which in one example embodiment is the flash memory 544. In various example embodiments, the data 539 includes service data including information required by the electronic device 100 to establish and maintain communication with the wireless network 501. The data 539 may also include user application data such as email messages, contacts, calendar and schedule information, notepad documents, image files, and other commonly stored user information stored on the electronic device 100 by its user, and other data. The data 239 stored in the persistent memory (e.g. flash memory 544) of the electronic device 100 may be organized, at least partially, into a number of databases each containing data items of the same data type or associated with the same application. For example, email messages, contacts, and task items may be stored in individual databases within the mobile device memory.

In some example embodiments, the electronic device 100 is provided with a service routing API which provides an application with the ability to route traffic through a serial data (e.g., USB) or Bluetooth® (Bluetooth® is a registered trademark of Bluetooth SIG, Inc.) connection to a host computer system using standard connectivity protocols. When a user connects their electronic device 100 to the host computer system via a USB cable or Bluetooth® connection, traffic that was destined for the wireless network 501 is automatically routed to the electronic device 100 using the USB cable or Bluetooth® connection. Similarly, any traffic destined for the wireless network 501 is automatically sent over the USB cable or Bluetooth® connection to the host computer system for processing.

The electronic device 100 also includes a battery 538 as a power source, which is typically one or more rechargeable batteries that may be charged, for example, through charging circuitry coupled to a battery interface 536 such as the data port 552. The battery 538 provides electrical power to at least some of the electrical circuitry in the electronic device 100, and the battery interface 536 provides a mechanical and electrical connection for the battery 538. The battery interface 536 is coupled to a regulator (not shown) which provides power V+ to the circuitry of the electronic device 100.

The short-range communication subsystem 572 is an additional optional component which provides for communication between the electronic devices 100 and different systems or devices, which need not necessarily be similar devices. For example, the subsystem 572 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the electronic device 100 during or after manufacture. Additional applications and/or upgrades to the operating system 522 or software applications 524 may also be loaded onto the electronic device 100 through the wireless network 501, the auxiliary I/O subsystem 550, the data port 552, the short-range communication subsystem 572, or other suitable subsystem 574 other wireless communication interfaces. The downloaded applications or code modules may be permanently installed, for example, written into the program memory (i.e. the flash memory 544), or written into and executed from the RAM 546 for execution by the processor 540 at runtime. Such flexibility in application installation increases the functionality of the electronic devices 100 and may provide enhanced on-device functions, communication-related functions, or both. For example, secure communication applications may enable electronic commerce functions and other such financial transactions to be performed using the electronic devices 100.

The electronic device 100 may provide two principal modes of communication: a data communication mode and, in some example embodiments, a voice communication mode. In the data communication mode, a received data signal such as a text message, an email message, or Web page download will be processed by the communication subsystem 511 and input to the processor 540 for further processing. For example, a downloaded Web page may be further processed by a browser application or an email message may be processed by an email message application and output to the display 204. A user of the electronic device 100 may also compose data items, such as email messages, instant messages, SMS messages, and MMS messages, using input mechanisms associated with that electronic device 100 and/or the auxiliary I/O subsystems 550. These composed items may be transmitted through the communication subsystem 511 over the wireless network 501.

In the voice communication mode, the electronic device 100 provides telephony functions and operates as a typical cellular phone. The overall operation is similar, except that the received signals would be output to the speaker 556 and signals for transmission would be generated by a transducer such as the microphone 558. The telephony functions are provided by a combination of software/firmware (i.e., the voice communication module) and hardware (i.e., the microphone 558, the speaker 556 and input devices). Alternative voice or audio I/O subsystems, such as a voice message recording subsystem, may also be implemented on the electronic device 100. Although voice or audio signal output is typically accomplished primarily through the speaker 556, the display module 204 may also be used to provide an indication of the identity of a calling party, duration of a voice call, or other voice call related information.

The example embodiments of the present disclosure described above are intended to be examples only. Those of skill in the art may effect alterations, modifications and variations to the particular embodiments without departing from the intended scope of the present disclosure. In particular, features from one or more of the above-described example embodiments may be selected to create alternate example embodiments included of a sub-combination of features which may not be explicitly described above. In addition, features from one or more of the above-described example embodiments may be selected and combined to create alternate example embodiments included of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A key lighting assembly for lighting one or more keys on an electronic device, the assembly comprising:

a keycap, defining a key, the keycap having a non-opaque portion to identify the key;
a light guide, the light guide being mounted in spaced relation with the keycap;
an optical radiation source optically coupled to the light guide; and
a first opaque layer disposed on a first surface of the light guide, the first opaque layer defining a first opaque layer opening for passing optical radiation from the light guide to the keycap, the first opaque layer opening being located to permit optical radiation to be transmitted from the light guide to the non-opaque portion, wherein the light guide and the keycap define a gap between an interior surface of the keycap and the first surface of the light guide and wherein the first opaque layer opening passes optical radiation through the gap to the keycap.

2. The key lighting assembly of claim 1, wherein the non-opaque portion is a decoration on an external surface of the keycap.

3. The key lighting assembly of claim 1, wherein the keycap is cantilever mounted at a first end of the keycap and deflects at a second end to actuate one or more electrical switches.

4. The key lighting assembly of claim 1, wherein the keycap is a portion of an integrated keycap/display cover which includes a display cover connecting to the keycap.

5. The key lighting assembly of claim 1, wherein the keycap is cantilevered past an edge of a display module.

6. The key lighting assembly of claim 1, wherein the first opaque layer is a black tape affixed to the light guide.

7. The key lighting assembly of claim 1, further comprising a second opaque layer disposed on an interior surface of the keycap, the second opaque layer covering at least a portion of the interior surface of the keycap, the second opaque layer defining a second opaque layer opening for passing optical radiation, the second opaque layer opening being located in alignment with the non-opaque portion to permit optical radiation to travel to the non-opaque portion.

8. The key lighting assembly of claim 7, wherein the second opaque layer opening has a shape which corresponds to the shape of the non-opaque portion.

9. The key lighting assembly of claim 8, wherein the second opaque layer opening is larger than the non-opaque portion.

10. The key lighting assembly of claim 7, wherein the second opaque layer is a black pad printed layer.

11. An electronic device comprising:

a controller for controlling the operation of the electronic device;
at least one electrical switch connected to the controller for generating an input signal in response to actuation thereof; and
a key lighting assembly comprising:
  a keycap, defining a key, the keycap having a non-opaque portion to identify the key;
  a light guide, the light guide being mounted in spaced relation with the keycap;
  an optical radiation source optically coupled to the light guide; and
  a first opaque layer disposed on a first surface of the light guide, the first opaque layer defining a first opaque layer opening for passing optical radiation from the light guide to the keycap, the first opaque layer opening being located to permit optical radiation to be transmitted from the light guide to the non-opaque portion, the at least one electrical switch being disposed for actuation by an interior surface of the keycap, wherein the light guide and the keycap define a gap between an interior surface of the keycap and the first surface of the light guide and wherein the first opaque layer opening passes optical radiation through the gap to the keycap.

12. The electronic device of claim 11, wherein the non-opaque portion is a decoration on an external surface of the keycap.

13. The electronic device of claim 11, wherein the keycap is cantilever mounted at a first end of the keycap and deflects at a second end to actuate the electrical switch.

14. The electronic device of claim 11 further comprising:
a display module connected to the controller,
and wherein the keycap is a portion of an integrated keycap/display cover which includes a display cover connecting to the keycap and overlaying the display module.

15. The electronic device of claim 11, wherein the keycap is cantilevered past an edge of the display module.

16. The electronic device of claim 11, wherein the first opaque layer is a black tape affixed to the light guide.

17. The electronic device of claim 11, wherein the key lighting assembly further comprises:
a second opaque layer disposed on an interior surface of the keycap, the second opaque layer covering at least a portion of the interior surface of the keycap, the second opaque layer defining a second opaque layer opening for passing optical radiation, the second opaque layer opening being located in alignment with the non-opaque portion to permit optical radiation to travel to the non-opaque portion.

18. The electronic device of claim 17, wherein the second opaque layer opening has a shape which corresponds to the shape of the non-opaque portion.

19. The electronic device of claim 18, wherein the second opaque layer opening is larger than the non-opaque portion.

20. The electronic device of claim 17, wherein the second opaque layer is a black pad printed layer.

* * * * *